(12) United States Patent
Freitas et al.

(10) Patent No.: US 9,276,871 B1
(45) Date of Patent: Mar. 1, 2016

(54) LISP STRETCHED SUBNET MODE FOR DATA CENTER MIGRATIONS

(71) Applicant: CISCO TECHNOLOGY, INC., San Jose, CA (US)

(72) Inventors: Santiago Vazquez Freitas, Feltham (GB); Patrice Bellagamba, Saint-Raphael (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 168 days.

(21) Appl. No.: 14/220,922

(22) Filed: Mar. 20, 2014

(51) Int. Cl.
*G06F 15/167* (2006.01)
*H04L 12/911* (2013.01)
*H04L 29/12* (2006.01)

(52) U.S. Cl.
CPC ............ *H04L 47/70* (2013.01); *H04L 61/2007* (2013.01)

(58) Field of Classification Search
USPC .................................. 709/200, 213, 217, 239
See application file for complete search history.

(56) References Cited

U.S. PATENT DOCUMENTS

| | | | | |
|---|---|---|---|---|
| 8,417,938 B1* | 4/2013 | Considine | ............. | G06F 9/5088 713/151 |
| 2007/0121596 A1* | 5/2007 | Kurapati | ........... | H04L 29/06027 370/356 |
| 2008/0222580 A1* | 9/2008 | Banerjee | ............. | G06F 17/5045 716/136 |
| 2008/0222581 A1* | 9/2008 | Banerjee | ............. | G06F 17/5045 716/136 |
| 2008/0222589 A1* | 9/2008 | Banerjee | ............. | G06F 17/5045 716/119 |
| 2013/0329571 A1* | 12/2013 | Shimokawa | ............ | H04L 45/28 370/244 |
| 2014/0321459 A1* | 10/2014 | Kumar | ................ | H04L 47/2425 370/360 |
| 2015/0156183 A1* | 6/2015 | Beyer | ...................... | H04L 63/08 726/4 |

OTHER PUBLICATIONS

Farinacci, et al., "The Locator/ID Separation Protocol (LISP)," Internet Engineering Task Force (IETF), RFC 6830, ISSN: 2070-1721, Jan. 2013, 75 pages; http://tools.ietf.org/pdf/rfc6830.pdf.

* cited by examiner

*Primary Examiner* — El Hadji Sall
(74) *Attorney, Agent, or Firm* — Patent Capital Group

(57) ABSTRACT

The present disclosure describes methods and systems for enabling a migration of network elements from a first location to a second location remote from the first location without changing the Internet Protocol (IP) addresses, subnet mask, and/or default gateway of the network elements. The first location has a first Locator/Identifier Separation Protocol (LISP) router configured on a stick and the second location having a second LISP router configured on a stick. Both the first LISP router and the second LISP router are on the same subnet. Effectively, LISP provides a Layer 3 extension stretching a subnet across the first location and the second location (Stretched Subnet Mode (SSM)). By implementing LISP routers in this manner, system engineers can migrate network elements easily between two locations.

20 Claims, 12 Drawing Sheets

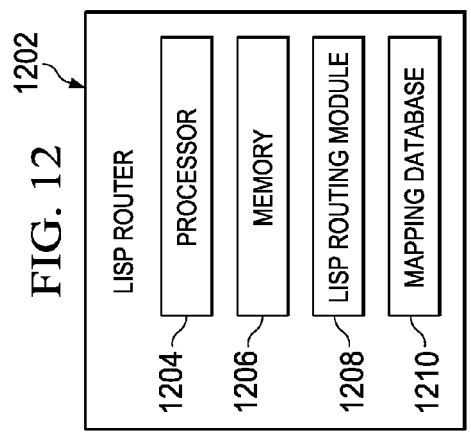
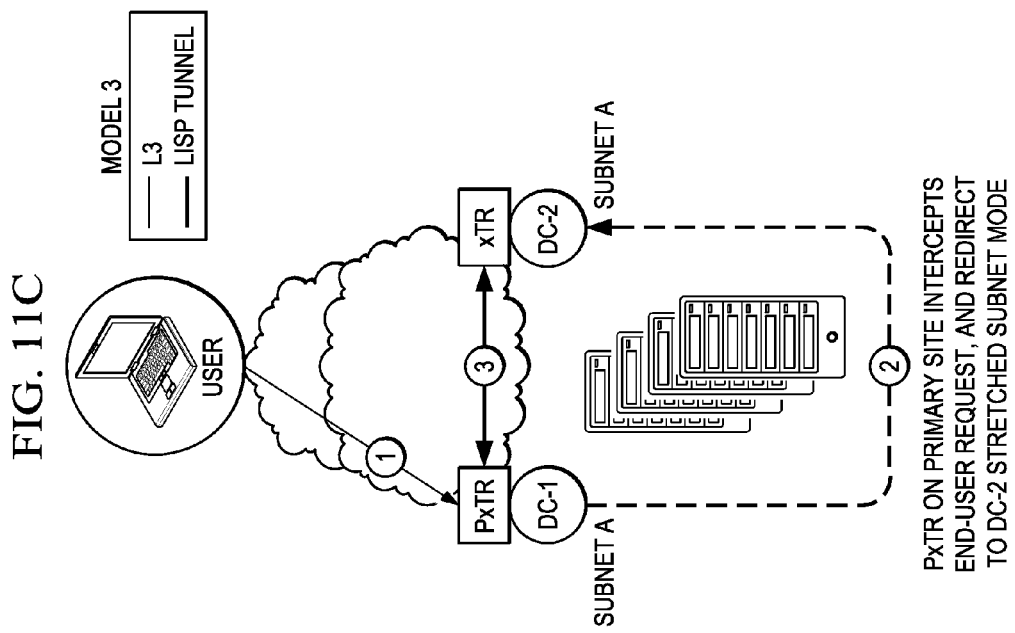

LISP STRETCHED SUBNET MODE FOR DATA CENTER MIGRATIONS

TECHNICAL FIELD

This disclosure relates in general to the field of communications and, more particularly, to using Locator/Identifier Separation Protocol (LISP) in stretched subnet mode for data center migrations.

BACKGROUND

A common requirement during data center (DC) migrations is the ability to move the servers (physical or virtual) between DCs while keeping their IP address. Changing the servers' IP addresses, subnet and default gateway configurations is cumbersome and costly so most application and server teams would prefer to avoid it.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 11C illustrates a deployment model corresponding to using LISP to enable migration of network elements without having to change the IP addresses of the network element, according to some embodiments of the disclosure; and FIG. 12 shows an exemplary system diagram of an illustrative LISP router, according to some embodiments of the disclosure.

DETAILED DESCRIPTION OF EXAMPLE EMBODIMENTS

Overview

Figure 1A:
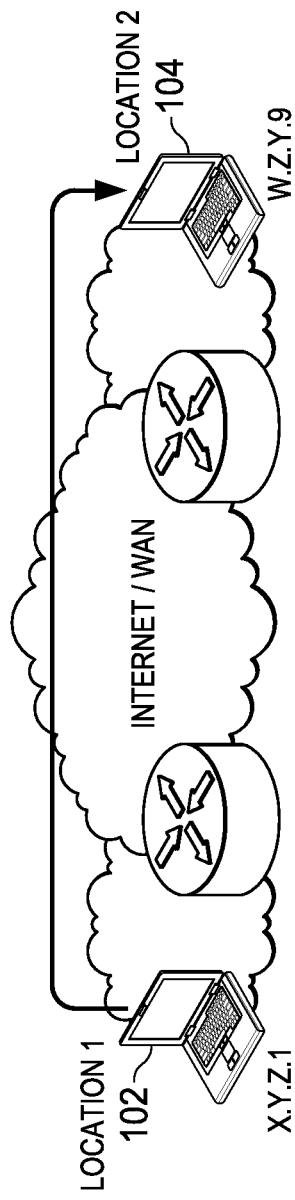
FIG. 1A is a simplified block diagram illustrating a migration of a network element, where when the network element moves from location 1 to location 2, its IP address changes because its IP address represents its identity and location.

A method for enabling a migration of network elements from a first location to a second location remote from the first location without changing the Internet Protocol (IP) addresses, subnet mask, and/or default gateway of the network elements is disclosed. The first location has a first Locator/Identifier Separation Protocol (LISP) router configured on a stick and the second location has a second LISP router configured on a stick. Both the first LISP router and the second LISP router are on the same subnet. The first LISP router detects a first network element having a first Internet Protocol (IP) address at the first location prior to the migration. The first LISP router receives, via a mapping database (from second LISP router at the second location) after the migration, an entry mapping the first IP address to the IP address of the second LISP router. The first LISP router updates a cache of the mapping database of the first LISP router to configure the first LISP router to route traffic targeted to the first network element through the first LISP router.

In some embodiments, the first LISP router transmits, to a first switch at the first location to which the first LISP is connected on a stick, an address resolution protocol message to inform the first switch to route the traffic targeted to the first network element via the first LISP router.

In some embodiments, the first LISP router acting as a proxy transmits, to the second LISP router, the traffic targeted to the first network element over a LISP tunnel established between the first LISP router and the second LISP router.

In some embodiments, the first LISP router encapsulating the traffic targeted to the first network element as LISP-encapsulated packets prior to transmitting the traffic over the LISP tunnel.

In some embodiments, the first LISP router removes virtual local area network information associated with the first location from the traffic targeted to the first network element prior to transmitting the traffic over the LISP tunnel.

In some embodiments, the first LISP router receives, from the second LISP router, return traffic from the first network element at the second location and transmits the return traffic from the first network element on an internal interface to provide the return traffic to a stateful device at the first location.

Another method for enabling a migration of network elements from a first location to a second location remote from the first location without changing the Internet Protocol (IP) addresses, subnet mask, and/or default gateway of the network elements is disclosed. The first location has a first Locator/Identifier Separation Protocol (LISP) router configured on a stick and the second location has a second LISP router configured on a stick. Both the first LISP router and the second LISP router are on the same subnet. The second LISP router detects a first network element having a first IP address at the second location, wherein the first network element was connected to the subnet at the first location prior to the migration using the same first IP address. The second LISP router updates a mapping database to include an entry mapping the first IP address to the IP address of the second LISP router. The second LISP router transmits, via the mapping database to the first LISP router, the entry to update a cache of the mapping database at the first LISP router to configure the first LISP router to route, to the second LISP router, traffic targeted to the first network element through the first LISP router.

In some embodiments, the second LISP router receives, from the first LISP router acting as a proxy via a LISP tunnel established between the first LISP router and the second LISP router, the traffic targeted to the first network element.

In some embodiments, the traffic targeted to the first network element originates from a second network element connected to a wide area network.

In some embodiments, the traffic targeted to the first network element originates from a third network element connected to the same or different subnet at the first location.

In some embodiments, the second LISP router is configured with the same IP address as a default gateway address used by the first network element prior to the migration.

A first Locator/Identifier Separation Protocol (LISP) router for enabling a migration of network elements from a first location to a second location remote from the first location without changing the Internet Protocol (IP) addresses of the network elements is disclosed. The first LISP router is connected to a first switch on a stick at the first location. The first LISP router includes: at least one memory element; at least one processor coupled to the at least one memory element. The first LISP router further includes a LISP routing module that when executed by the at least one processor is configured to: detect, at the first LISP router, a first network element having a first Internet Protocol (IP) address at the first location prior to the migration; receive, from a second LISP router at the second location after the migration via a mapping database, an entry mapping the first IP address to the IP address of the second LISP router, wherein the second LISP router is configured on a stick to a second switch at the second location and both the first LISP router and the second LISP router on the same subnet; and update a cache of a mapping database at the first LISP router to configure the first LISP router to route, to the second LISP router, traffic targeted to the first network element through the first LISP router.

In some embodiments, prior to the migration, the first LISP router connected to a first switch on a stick is not in a data path between the first network element and a second network element on the wide area network or between the first network element and a third network element located in the first location.

In some embodiments, the first LISP router is configured as a LISP proxy ingress and egress tunnel router to transmit the traffic targeted to the first network element via a LISP tunnel established between the first LISP router and the second LISP router.

A second Locator/Identifier Separation Protocol (LISP) router for enabling a migration of network elements from a first location to a second location remote from the first location without changing the Internet Protocol (IP) addresses of the network elements is disclosed. The second LISP router is connected to a second switch on a stick at the second location. The second LISP router includes: at least one memory element; at least one processor coupled to the at least one memory element. The second LISP router further includes a LISP routing module that when executed by the at least one processor is configured to: detect, at the second LISP router, a first network element having a first IP address at the second location, wherein the first network element was connected to a subnet at the first location prior to the migration using the same first IP address; update a mapping database to include an entry mapping the first IP address to the IP address of the second LISP router; and transmit to the first LISP router via the mapping database, the entry to update a cache of the mapping database at the first LISP router to configure the first LISP router to route, to the second LISP router, traffic targeted to the first network element through the first LISP router, wherein the first LISP router is configured on a stick to a first switch at the first location and both the first LISP router and the second LISP router on the same subnet.

In some embodiments, the second LISP router is configured as an LISP ingress and egress tunnel router with a mapping server and a mapping resolver implemented thereon to maintain the mapping database and transmit updates to a cache of the mapping database at the first LISP router.

A system for enabling a migration of network elements from a first location to a second location remote from the first location without changing the Internet Protocol (IP) addresses of the network elements is disclosed. The system includes a first LISP router configured on a stick to a first switch at the first location; a second LISP router configured on a stick to a second switch at the second location, wherein both the first LISP router and the second LISP router on the same subnet; and a horizontal LISP tunnel between the first LISP router and the second LISP router providing a Layer 3 extension stretching a subnet across the first location and the second location. The second LISP router is configured to, via a mapping database, update a cache of the mapping database at the first LISP router to configure the first LISP router to route, via the first LISP router over the horizontal LISP tunnel, traffic targeted to a first network element migrated from the first location to the second location.

In some embodiments, the cache of the mapping database at the first LISP router and a cache of the mapping database of the second LISP router each comprises an entry mapping a first IP address of the first network element to the IP address of the second LISP router, wherein the first network element was connected to a subnet at the first location prior to the migration using the same first IP address.

A computer-readable non-transitory medium comprising one or more instructions, for enabling a migration of network elements from a first location to a second location remote from the first location without changing the Internet Protocol (IP) addresses, subnet mask, and default gateway of the network elements is disclosed. The first location has a first Locator/Identifier Separation Protocol (LISP) router configured on a stick and the second location has a second LISP router configured on a stick. Both the first LISP router and the second LISP router are on the same subnet. When the instructions are executed on a processor, the instructions configure the processor to perform one or more operations comprising: detecting, by the first LISP router, a first network element having a first Internet Protocol (IP) address at the first location prior to the migration; receiving, at the first LISP router via a mapping database from a second LISP router at the second location after the migration, an entry mapping the first IP address to the IP address of the second LISP router; and updating, by the first LISP router, a cache of the mapping database at the first LISP router to configure the first LISP router to route, to the second LISP router, traffic targeted to the first network element through the first LISP router.

A computer-readable non-transitory medium comprising one or more instructions, for enabling a migration of network elements from a first location to a second location remote from the first location without changing the Internet Protocol (IP) addresses, subnet mask, and default gateway of the network elements is disclosed. The first location has a first Locator/Identifier Separation Protocol (LISP) router configured on a stick and the second location has a second LISP router configured on a stick. Both the first LISP router and the second LISP router are on the same subnet. When the instructions are executed on a processor, the instructions configure the processor to perform one or more operations comprising: detecting, at the second LISP router, a first IP address of a first network element located at the second location, wherein the first network element was connected to a subnet at the first location prior to the migration using the same first IP address; updating, at the second LISP router, a the mapping database to include an entry mapping the first IP address to the IP address of the second LISP router; and transmitting, from the second LISP router via the mapping database to the first LISP router, the entry to update a cache of the mapping database at the first LISP to configure the first LISP router to route, to the second LISP router, traffic targeted to the first network element through the first LISP router.

EXAMPLE EMBODIMENTS

Understanding Challenges in Migration

Migration of servers from a first location (e.g., an original data center) to a second location remote from the first location (e.g., a target data center) is a task, which many server engineers face. These migrations are often necessary to improve the performance of the servers by upgrading to a better data center, or to meet other requirements, which prompted servers to be moved from a first location to another location. However, these migrations between customer data centers (DCs) or from a legacy to a new environment within DCs. often take too long to perform. Usually, many services and network components depend on the Internet Protocol (IP) addresses of servers for correctly identifying the servers on the network. Thus, when servers migrate from a first location to a second location, it is generally preferred that IP addresses, subnet masks, and default gateway IP address do not change during or after migration. However, migration network solutions that provide IP retention can be unreliable, complex, and expensive. For instance, extending a Layer 2 domain between DCs to solve this problem is not always perceived as optimal in term of resiliency, due to broadcast domain interconnection that could cause a failure in the original DC to impact the target DC.

In many application deployments, each server has multiple Network Interface Cards and/or IP addresses belonging to multiple subnets. When trying to migrate such servers, this creates a high level of dependency because all the servers that exist on the same subnets as the server to be migrated, also needs to be migrated at the same time, leading to a "Big Bang" migration where every server must be moved at the same time. The "Big Bang" approach impacts heavily the time and complexity of DC migrations, and also requires that all the data (storage) for all the servers to be copied at once to the new DC. This is an extremely unpractical approach, and thus is seldom performed.

Fundamentals of Locator/Identifier Separation Protocol (LISP)

FIG. 1A is a simplified block diagram illustrating a migration of a network element, where when the network element moves from location 1 to location 2, its IP address changes because its IP address represents its identity and location. The Internet architecture combines two functions, routing locators (where a client is attached to the network) and identifiers (who the client is) in one number space: the IP address. Thus, when a network element migrates, the IP address necessarily changes. In this illustration, a network element (shown as device 102 in the FIGURE) has an Internet Protocol version 4 (IPv4) or Internet Protocol version 6 (IPv6) address, and such address (e.g., X.Y.Z.1) represents the network element's identity and its location. When the network element moves from Location 1 to Location 2, the same network element (shown as device 104 in the FIGURE) gets a new IPv4 or IPv6 address for its new identity and location.

Using a single address field for both identifying a device and for determining where it is topologically located in the network requires optimization along two conflicting axes: for routing to be efficient, the address must be assigned topologically; for collections of devices to be easily and effectively managed, without the need for renumbering in response to topological change (such as that caused by adding or removing attachment points to the network or by mobility events), the address must explicitly not be tied to the topology. Such a routing and addressing system, which uses an IP address to represent both identity and location, is not scalable or flexible.

To address this routing and addressing issue, the Locator/Identifier Separation Protocol (LISP) (outlined in Internet Engineering Task Force (IETF) RFC 6830) was proposed. LISP is a "map-and-encapsulate" protocol, which aims to separate identity and location. The approach that LISP takes to solving the routing scalability problem is to replace IP addresses with two new types of numbers: Routing Locators (RLOCs), which are topologically assigned to network attachment points (and are therefore amenable to aggregation) and used for routing and forwarding of packets through the network; and Endpoint Identifiers (EIDs), which are assigned independently from the network topology, are used for numbering devices, and are aggregated along administrative boundaries. LISP then defines functions for mapping between the two numbering spaces and for encapsulating traffic originated by devices using non-routable EIDs for transport across a network infrastructure that routes and forwards using RLOCs. Both RLOCs and EIDs are syntactically identical to IP addresses; it is the semantics of how they are used that differs.

Broadly speaking, LISP provides a network-layer-based protocol that enables separation of IP addresses into two new numbering spaces: EIDs and RLOCs. No changes are required to either host protocol stacks or to the "core" of the Internet infrastructure. Locator/Identifier Separation Protocol (LISP) provides a set of functions for routers to exchange information used to map from EIDs that are not globally routable to routable RLOCs. A mapping database and caches of said mapping database is provided to LISP routers which maps EIDs to RLOCs, and a LISP routing module is provided to equipment such as routers to perform routing based on the mapping database or a cache thereof. LISP also defines a mechanism for these LISP routers to encapsulate IP packets addressed with EIDs for transmission across a network infrastructure that uses RLOCs for routing and forwarding.

Figure 1B:
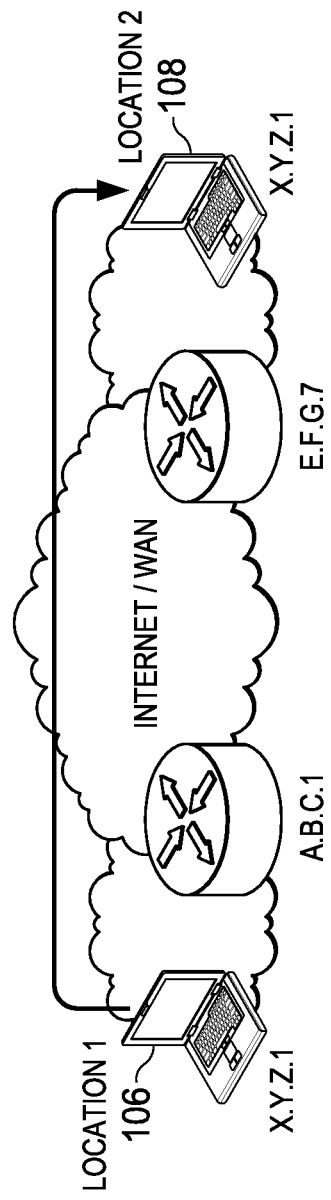
FIG. 1B is a simplified block diagram illustrating a migration of a network element, where when the network element moves from location 1 to location 2 its IP address configuration (its identity) doesn't change, only its location changes, according to some embodiments of the disclosure.

FIG. 1B is a simplified block diagram illustrating a migration of a network element, where when the network element moves from location 1 to location 2 its IP address configuration (its identity) does not change, only its location changes, according to some embodiments of the disclosure. By applying LISP protocol, a network element (shown as device 106 in the FIGURE) has an Internet Protocol version 4 (IPv4) or Internet Protocol version 6 (IPv6) address, and such address (e.g., X.Y.Z.1) represents the network element's identity only. When the network element moves from Location 1 to Location 2, the same network element (shown as device 108 in the FIGURE) keeps the same IP address (i.e., its identity), and only the location changes.

Adapting LISP for Improving Migrations: Stretched Subnet Mode

LISP was not originally really designed for DC migrations. In particular, LISP's intended use cases included Efficient Multi-Homing Support, IPv6 Transition, Virtualization/Multi-Tenancy Support and, DC VM-Mobility Support and LISP Mobile-Node Support. Even though LISP is not intended for migration of network elements, the technical and architectural features of LISP can be adapted and leveraged to meet the requirements of users who want to perform server migration without extending Layer 2 between locations. Specifically, LISP can be adapted in such a way that is analogous to a Layer 3 extension.

The present disclosure describes how migration can be achieved without Layer 2 extension by diverting LISP IP mobility to enable a migration of network elements from a first location (e.g., an original data center) without changing their IP addresses, subnet mask, and default gateway and landing the network elements on at a second location remote from the first location (e.g., a target data center) on the same subnet that the network elements were using at the first location. Effectively, LISP provides a Layer 3 extension stretching a subnet across the first location and the second location (referred herein as Stretched Subnet Mode (SSM)). Note that Stretched Subnet Mode (SSM) is not LISP Extended Subnet Mode (ESM) because there is no Layer 2 extension between the two locations, and it is also not Across Subnet Mode (ASM) because the subnet on the second location is the same as the one at the first location, not a new (foreign) one.

Through Stretched Subnet Mode (SSM), network elements such as physical or virtual servers can be migrated from one location to another without changing their IP address, subnet mask, default gateway, firewall rules, and/or load balancer statements. SSM effectively lets users to perform migrations in very small batches or waves (i.e., small group of servers) which enables them to start the migration sooner and finish it quicker. Also, with small migration waves, only the data (storage) associated with the servers being migrated need to be copied to the new site, hugely minimizing the amount of data that has to be copied between the sites before a server migration can start.

Besides allowing migration to be performed in small waves, LISP SSM has another advantage—LISP routers applying SSM can be deployed non-disruptively into an existing/production environment. Deployment can include two LISP nodes (a first LISP router at the first location and a second LISP router at the second location). For instance, a first LISP router is connected to a switch at the first location on a stick, and a second LISP router is connected to a switch at the second location on a stick. The "router on a stick" configuration allows these LISP routers to be deployed without any major changes to the Wide Area Network or the first location (e.g., the existing data center, in some cases having legacy network equipment). The only effect SSM has at the first location is on the switch at the first location, where a port configured as trunk (IEEE 802.1Q) allowing the VLANs for the subnets to be migrated is connected to the LISP router that also has its interface configured as IEEE 802.1Q trunk—this is an example configuration on the switch to configure the first LISP router on a stick. Furthermore, at the end of the migration the two LISP routers can be smoothly removed from the network without disrupting the second location. More LISP routers can be deployed at the first location and/or the second location for redundancy.

A LISP router a stick means that the LISP router is not on the data path until it is required to be. The LISP router on a stick can deployed non-intrusively as the LISP router on a stick is not the default gateway for network elements at original DC and is not on the data path until it is required to be because of a migration of a network element from location 1 to location 2. In summary the LISP router on a stick is not on the data path nor is the LISP router the default gateway for network elements at the original DC prior to migration.

Figure 2:
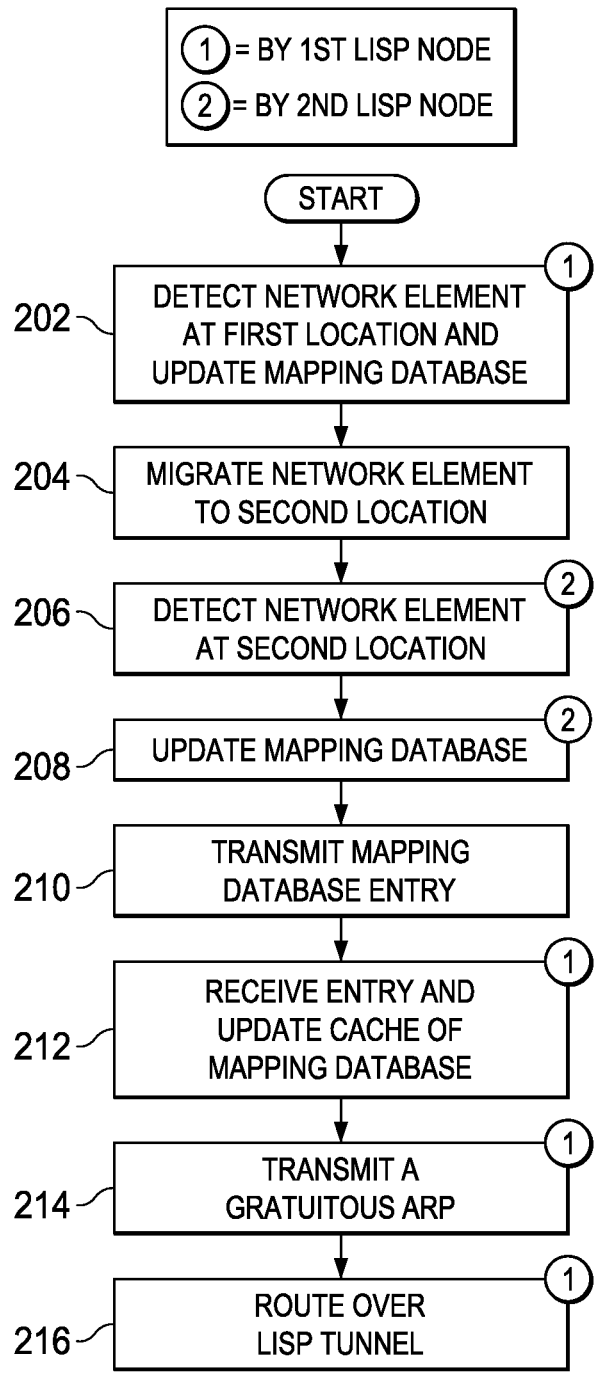
FIG. 2 is a simplified flow diagram illustrating methods for enabling a migration of network elements from a first location to a second location without changing the IP addresses of the network elements, according to some embodiments of the disclosure.

FIG. 2 is a simplified flow diagram illustrating methods for enabling a migration of network elements from a first location to a second location without changing the IP addresses of the network elements, according to some embodiments of the disclosure. Specifically, the illustrated method comprises parts of the method performed by LISP routers for enabling a migration of network elements from a first location to a second location remote from the first location without changing the Internet Protocol (IP) addresses of the network elements. The first location has a first Locator/Identifier Separation Protocol (LISP) router configured on a stick, and the second location has a second LISP router configured on a stick.

For this method, a mapping database (system) is provided, which can be with either the first LISP router or the second LISP router, to maintain entries mapping identities of network elements to the locations of the LISP routers via which the network elements are reachable. The mapping database can also be provided on a separate LISP-enabled entity/system apart from the first LISP router. The first LISP router and/or the second LISP router has a cache, which is a copy (requested on demand) of at least a part of the mapping database to facilitate routing of LISP encapsulated packets. A LISP router detecting a new network element at the location in which the LISP router is deployed can update the mapping database with entry associating the identity of the network element with the location of the LISP router. The LISP router can also update its own cache (if there is one at the LISP router) as well. By updating the mapping database, the LISP router can transmit via the mapping database (system) the new entry to other LISP routers. In a way, the LISP router causes other cache(s) of the mapping database to be updated with the new entry. This mechanism of the mapping database (system) and cache(s) allows routing to occur properly after the migration.

Prior to the migration, the first LISP router detects a first network element having a first Internet Protocol (IP) address at the first location (box 202). At this point, the first LISP router can update the mapping database (and a cache of the mapping database at the first LISP router, if applicable) associating the location of the first LISP router with the first network element. The first network element is migrated from the first location to the second location (box 204). The second LISP router detects the first network element having the first IP address at the second location (box 206) after the first network element has moved to the second location. The first network element was connected to a subnet at the first location prior to the migration using the same first IP address. SSM allows that original subnet to be stretched to the second location. This means that both the first LISP router and the second LISP router are provided on the same/original subnet.

Upon detecting the first network element at the second location, the second LISP router updates a mapping database (and a cache of the mapping database, if applicable) to include an entry mapping the first IP address to the IP address of the second LISP router (box 208). Furthermore, the second LISP router transmits, e.g., via the mapping database (system), to the first LISP router, the entry to update a cache of the mapping database at the first LISP router to configure the first LISP router to route, to the second LISP router, traffic targeted to the first network element through the first LISP router (box 210). The first LISP router receives, via the mapping database (system) from a second LISP router at the second location after the migration, an entry mapping the first IP address to the IP address of the second LISP router and updates the cache of the first LISP router to configure the first LISP router to route, to the second LISP router, traffic targeted to the first network element through the first LISP router (box 212).

The result of updating the mapping database and the cache of the mapping database at the first LISP router allows the first LISP router to attract traffic to the first network element and proxy that traffic through the first LISP router. Specifically, the first LISP router transmits an Gratuitous Address Resolution Protocol (ARP) message and implements proxy ARP (box 214) to employ a technique by which a first LISP router answers the ARP queries for the first IP address (i.e., corresponding to the first network element no longer at the first location). The first LISP router as a proxy is aware of the location of the traffic's destination, and offers its own MAC address in reply, effectively saying, "send it to me, and I'll get it to where it needs to go." Serving as a proxy for the first network element (and any other network element migrated over to the second location) effectively directs traffic targeted to the network element to the first LISP router. The "captured" traffic is then routed by the proxy to the first network element (or the suitable intended destination) via a LISP tunnel between the first LISP router and the second LISP router (box 216).

Implementing the mechanisms outlined in FIG. 2, traffic targeted to the first network element is able to travel from a second network element on the wide area network or from a third network element at the first location (e.g., connected to the subnet at the first location) via the first LISP router and over the LISP tunnel between the first LISP router and the second LISP router. By providing this method, the first LISP router and the second LISP router facilitates migration of network elements without having to change the IP addresses of those network elements, and allows migration to occur in small waves. The network elements remains in the same subnet, even though the location of the network elements have changed after the migration. The following passages explains each of these mechanisms in further detail.

LISP Router on a Stick

Figure 3:
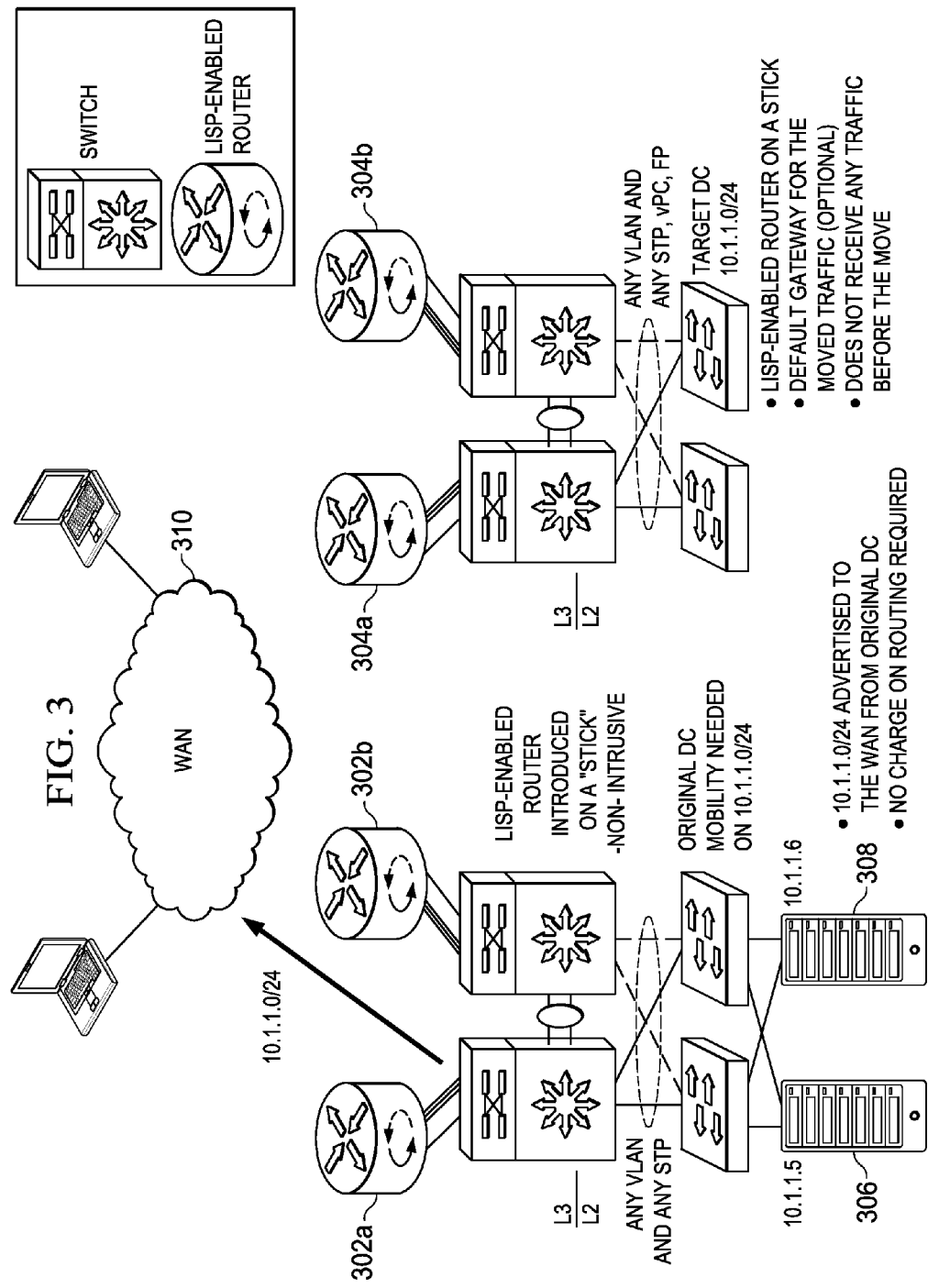
FIG. 3 is a simplified diagram showing an exemplary system having LISP routers for enabling migration of servers from an original data center to a target data center, according to some embodiments of the disclosure.

FIG. 3 is a simplified diagram showing an exemplary system having LISP routers for enabling migration of servers from an original data center ("original DC") to a target data center ("target DC"), according to some embodiments of the disclosure. The original DC is considered as the "first location", and the target DC is considered as the "second location". As shown, the first LISP router 302a and another LISP router 302b are each configured on a stick for redundancy at the first location. Even though redundant LISP routers are shown, it is not necessary to provide redundant LISP routers. Accordingly, only one LISP router can be deployed at each of the locations (and redundant routers as shown are omitted). It is envisioned that more or less (e.g., just one) LISP routers can be deployed at the first location. Also, the second LISP router 304a and another LISP router 304b are each configured on a stick for redundancy at the second location. It is envisioned that more or less (e.g., just one) LISP routers can be deployed at the second location. For brevity, the present disclosure will focus on an embodiment illustrating a system where a first LISP router 302a is provided on a stick to a switch at the first location, and a second LISP router 304a is provided on a stick to a switch at the second location (without necessarily referring to the redundant routers shown on the FIGURES).

At the original data center, network elements (e.g., server 306 and server 308) are connected to a subnet at the original data center. Any Virtual Local Area Networks may exist and Spanning Tree Protocols may be used in the subnet at the original data center. The present disclosure describes an improved system and method for migrating these network elements.

A second LISP router (e.g., LISP router 304a) is also configured on a stick to a switch at the second location. Prior to the migration, the second LISP router may not receive any traffic at all. Optionally, the second LISP router can be configured with the same IP address as a default gateway address used by the first network element prior to the migration. Advantageously, the first network element does not have to update its default gateway address after the first network element moves to the second location. Network at the second location can have any Virtual Local Area Networks, and implement practically any type of Layer 2 technologies (spanning tree protocol, virtual port channels, multichassis EtherChannel, Transparent Interconnection of Lots of Links, etc.). It is noted, in particular, that these Layer 2 technologies are not affected by the Stretched Subnet Mode of the present disclosure because the Stretched Subnet Mode occurs at Layer 3.

A "router on a stick" is a term commonly used in the networking industry, and can sometimes be referred to a "stub router", "one-armed router", etc. A LISP router within the context of the disclosure includes a network router having LISP functionality enabled/implemented thereon. The LISP router may be an aggregation services router (ASR). For network elements in different subnets or within the same subnet to communicate (e.g., network elements at the first location, network elements at the second location, network elements at the wide area network 310), the LISP router (a Layer 3 device) is provided to route between the subnets when traffic needs to be routed between locations. A LISP router (configured) on a stick may have a single Ethernet Network Interface Card that is part of two or more subnets (thereby providing a trunk) enabling the two or more subnets to communicate. For instance, the LISP router on a stick joins any subnet(s) at the first location with subnet(s) at the target DC. When traffic needs to travel from the original DC to the network elements at the target DC, the traffic must be routed by the LISP router configured on a stick.

The LISP router on a stick also means that the LISP router is non-intrusive, and the LISP router is not the default gateway for network elements at original DC. The LISP router is not on the data path nor is the LISP router the default gateway for network elements at the original DC prior to migration. Such "router on a stick" configuration requires no change on the routing at the original DC, and the subnet (e.g. "10.1.1.0/24") continues to be advertised to the wide area network 310 by the first location (e.g., the original data center).

Figure 4:
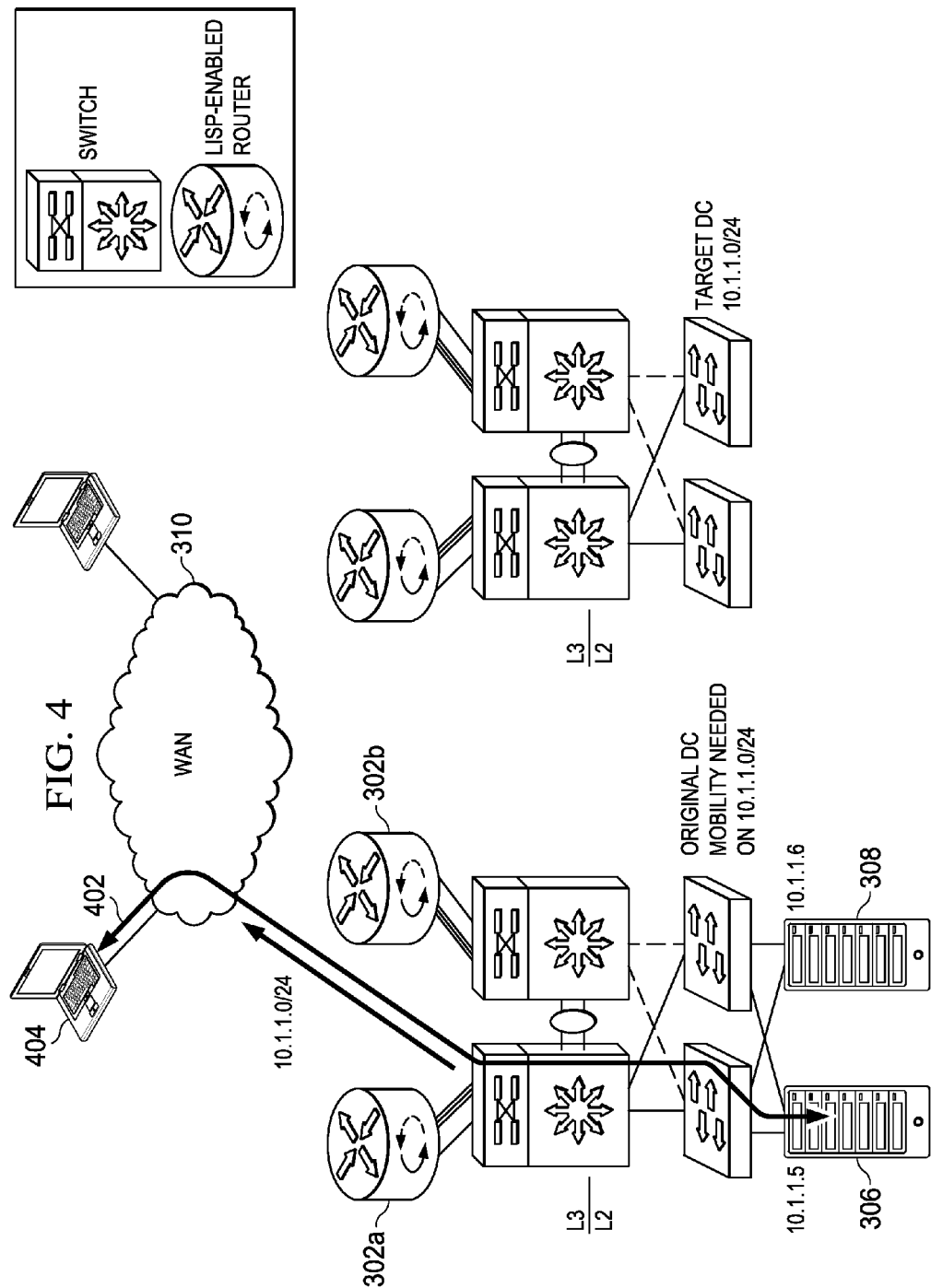
FIG. 4 is a simplified diagram showing a data path between a server that has not been moved yet but is on the subnet where mobility is needed and a network element on the wide area network, according to some embodiments of the disclosure.

FIG. 4 is a simplified diagram showing a data path between a server on the subnet where mobility is needed and a network element on the wide area network, according to some embodiments of the disclosure. Prior to migration, the data path 402 between a second network element 404 (e.g., a user communicating with a server 10.1.1.5) on the wide area network 310 and the first network element 306 does not traverse the first LISP router 302a configured on a stick. Traditionally, LISP had always been proposed to be deployed on the routers that are the default gateway. This previous model is disruptive for the original data center (DC). In stark contrast, the present disclosure requires the LISP router to be configured on a stick, which is far less intrusive to the original DC. This "router on a stick" configuration to place the LISP router in the original DC without being in the data path (until migration requires it) solves a major objection for LISP introduction in a production environment.

Figure 5:
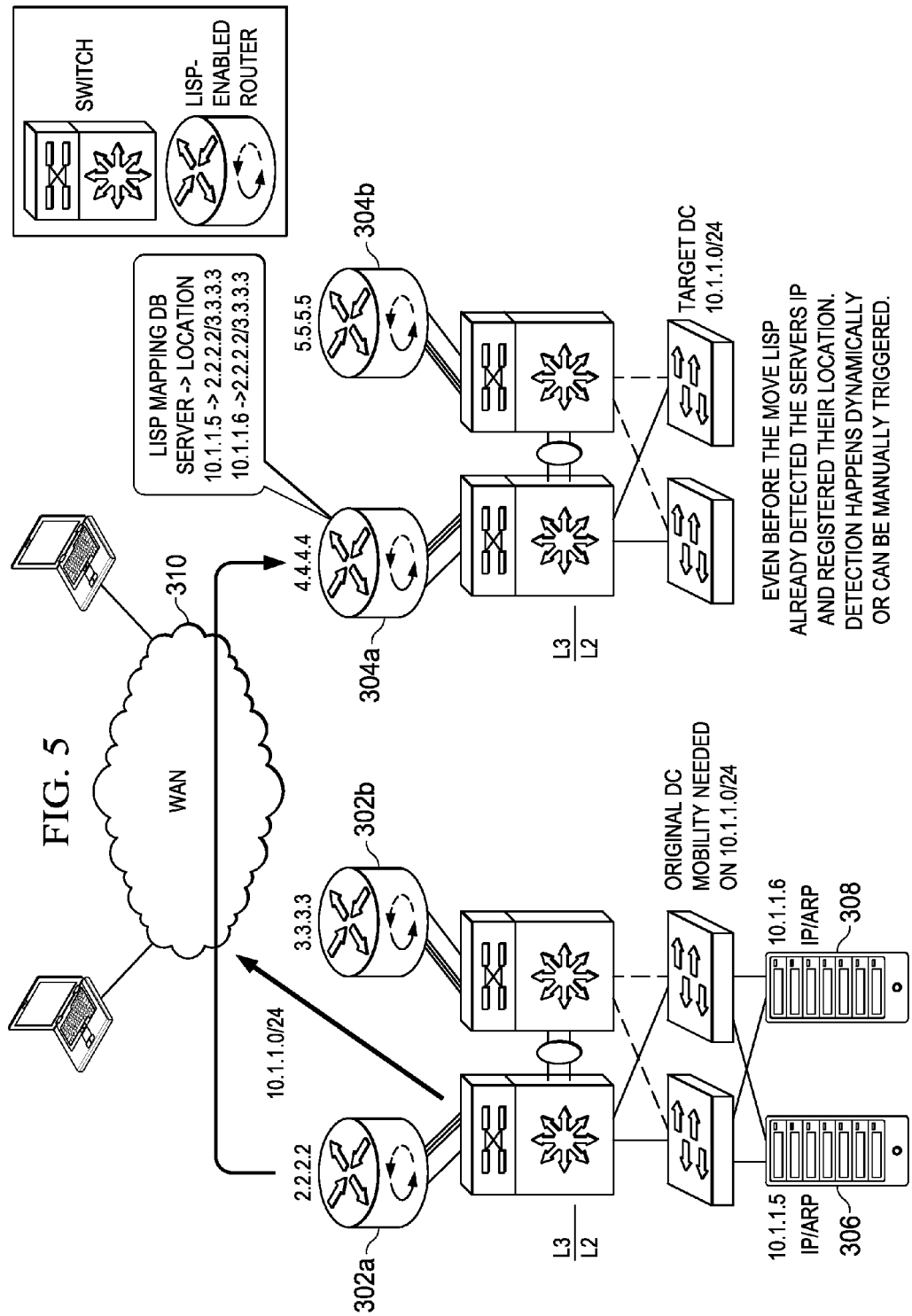
FIG. 5 is a simplified diagram showing detection of a server on the subnet where mobility is needed; according to some embodiments of the disclosure.

FIG. 5 is a simplified diagram showing detection of a server on the subnet where mobility is needed; according to some embodiments of the disclosure. By being connected to the same subnet where migration is to be performed (or where mobility is needed), the first LISP router 302a can detect the first network elements 306 and a third network element 308 (hosts/servers identified by the "EIDs") by listening to Address Resolution Protocol (ARP) messages that may be sent by the network elements themselves (announcing their identity, e.g., "10.1.1.5" and "10.1.1.6"), for example during boot up time, or by initiating traffic (e.g., transmitting an Internet Control Message Protocol request) to the network elements 306 and 308 in the subnets to be migrated. Listening for ARP messages allows a mapping to be made between locations of the LISP routers (or other suitable RLOCs) and the IP addresses of the network elements at the same location of the LISP routers (or other suitable EIDs). In this example original DC, the first LISP router 302a is located at "2.2.2.2", and the other LISP router 302b for redundancy is located at "3.3.3.3". In this example target DC, the second LISP router 304a is located at "4.4.4.4", and the other LISP router 304b for redundancy is located at "5.5.5.5".

In this illustration, the first LISP router 302a detects the first network element 306 having a first IP address (e.g., "10.1.1.5") at the first location prior to the migration, and stores an entry in the mapping database mapping the first IP address to the location of the first LISP router (e.g., "10.1.1.5→2.2.2.2", or if redundant LISP routers are used, "10.1.1.5→2.2.2.2/3.3.3.3"). The first LISP router 302a also detects the third network element 308 having a third IP address (e.g., 10.1.1.6) at the first location prior to the migration, and stores an entry in the mapping database mapping the third IP address to the location of the first LISP router (e.g., "10.1.1.6→2.2.2.2", or if redundant LISP routers are used, "10.1.1.6→2.2.2.2/3.3.3.3"). The use of a mapping database allows the LISP system to know the location of each network element (e.g., servers) and for LISP routers to update their respective caches of the mapping database if applicable, advantageously allowing users to easily check where a network element is located.

After the Network Element(s) Move

Figure 6:
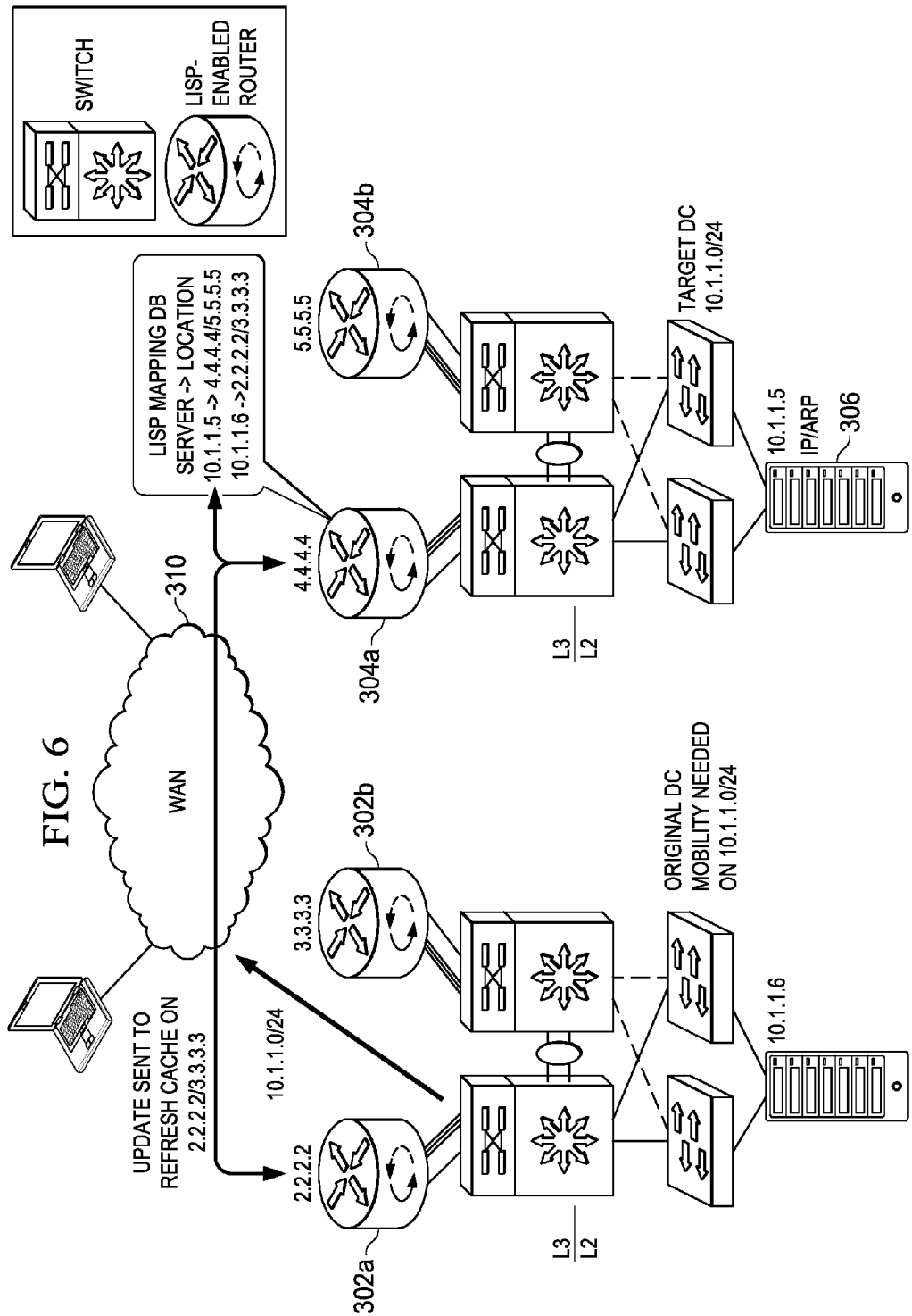
FIG. 6 is a simplified diagram showing updating of a mapping database and its cache(s) for at least two LISP routers after a server is migrated to the target data center.

FIG. 6 is a simplified diagram showing updating of the mapping database and cache(s) of the mapping database for at least two LISP routers after a server is migrated to the target data center. The first network element 306 (having the first IP address "10.1.1.5") has been moved from the original DC (i.e., the first location) to the target DC (i.e., the second location). The second LISP router at the target DC (i.e., the second location) detects the first network element 306 having the first IP address is now located at the second location. For instance, the second LISP router 304a may listen to Address Resolution Protocol (ARP) messages that may be sent by the first network element 306 (announcing their identity, e.g., "10.1.1.5"), for example during boot up time, or by initiating traffic (e.g., transmitting an Internet Control Message Protocol request) to the network elements 306. Note the important feature of keeping the same IP address (i.e., "10.1.1.5") that the first network element 306 used when connected to the subnet "10.1.1.0/24" at the original DC (the first location), even when the first network element 306 is at the target DC (the second location). Also, note the subnet "10.1.1.0/24" did not change, and effectively the subnet is stretched between the original DC and the target DC. If the second LISP router 304a is configured with the same IP address of the default gateway address used by the first network element prior to the migration, the default gateway address does not have to change either, thereby minimizing changes to configuration for the first network element 306.

In this illustration, the second LISP router 304a detects the first network element 306 having the first IP address (e.g., "10.1.1.5") at the second location. The second LISP router 304a then updates the mapping database (and a cache of the mapping database at the second LISP router) to include an entry mapping the first IP address to the IP address of the second LISP router (e.g., "10.1.1.5→4.4.4.4", or if redundant LISP routers are used, "10.1.1.5→4.4.4.4/5.5.5.5"). In this example, the cache of mapping database located on the second LISP router may have a mapping database, which includes entries "10.1.1.5→4.4.4.4/5.5.5.5" and "10.1.1.6→2.2.2.2/3.3.3.3". The second LISP router 304a may transmit, via the mapping database (system), to the first LISP router 302a the entry to update (the cache of) the mapping database of the first LISP router 302a. This informs the first LISP router that the first network element is now located at the target DC with the second LISP router, and the traffic should be forwarded to the second LISP router with the address "4.4.4.4". The update allows the first LISP router to route, to the second LISP router, traffic targeted to the first network element through the first LISP router. Once the mapping database and respective cache(s) are updated, the first LISP router 302a and the second LISP router 304a are equipped with the proper information to locate the migrated network element 306 (and route traffic targeted to the first network element appropriately), even though the first IP address (e.g., "10.1.1.5") did not change when the first network element 306 changed its location from the original DC to the target DC.

Proxy ARP and LISP Tunnel Between LISP Routers Across Locations

Figure 7:
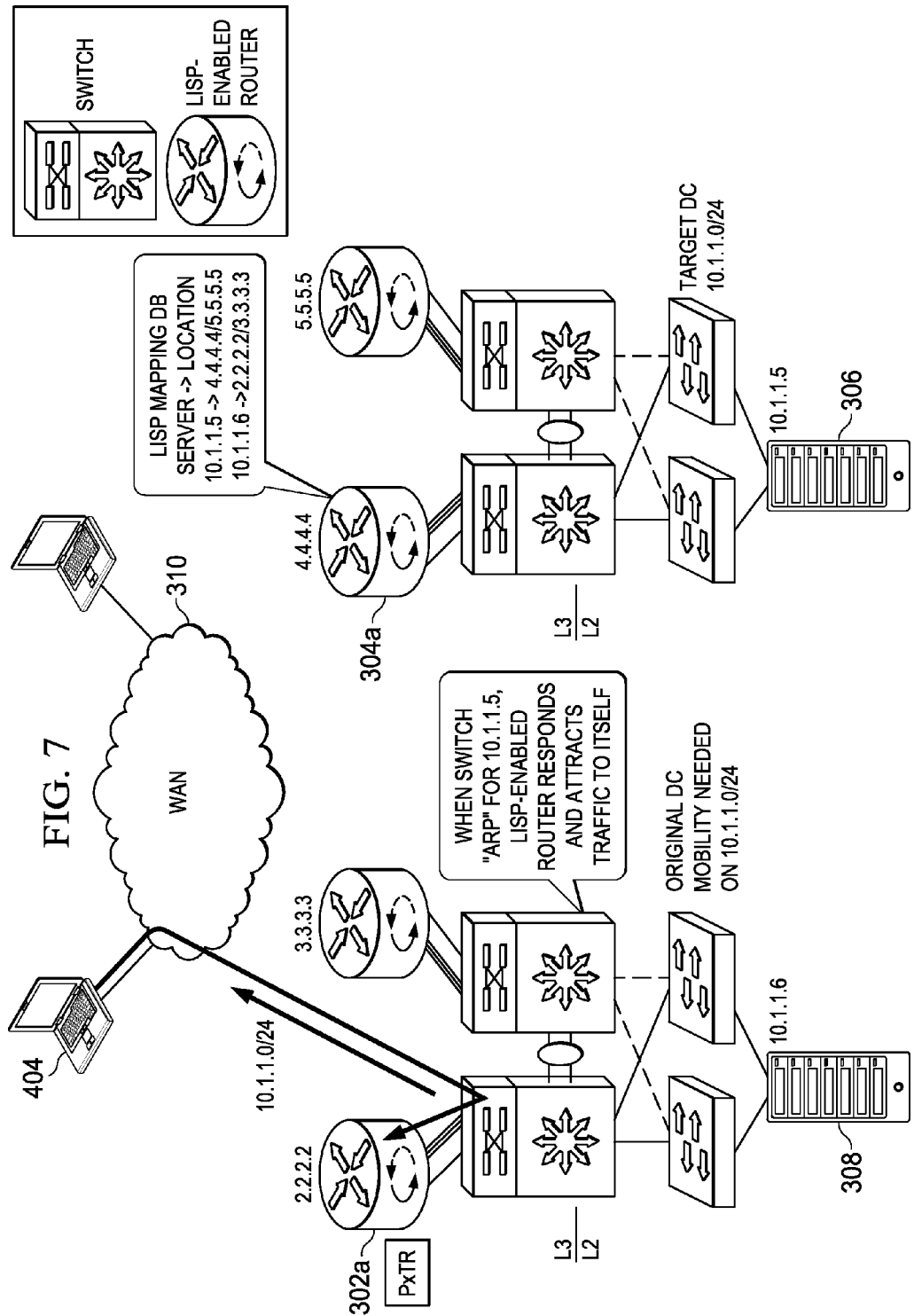
FIG. 7 is a simplified diagram showing the LISP Router responding to address resolution protocol request for the migrated server in order to route traffic targeted to the migrated server via the LISP router at the original data center, according to some embodiments of the disclosure.

FIG. 7 is a simplified diagram showing responding to address resolution protocol request for the migrated server in order to route traffic targeted to the migrated server via a LISP router at the original data center, according to some embodiments of the disclosure. When traffic from the second network element 404 on the wide area network 310 is targeted to the first network element 306 having the first IP address "10.1.1.5", the traffic is sent to the "10.1.1.0/24" subnet at the first location (e.g., the original data center). The switch at first location sends an ARP request, which is broadcasted, to locate IP address "10.1.1.5", and the first LISP router 302 responds. Specifically, the first LISP router 302a transmits to a first switch at the first location to which the first LISP is connected on a stick, an ARP message to inform the first switch to route the traffic targeted to the first network element via the first LISP router. In this manner, the first LISP router 302a provides a proxy ARP mechanism to attract traffic targeted for network elements at the target DC to itself.

Figure 8:
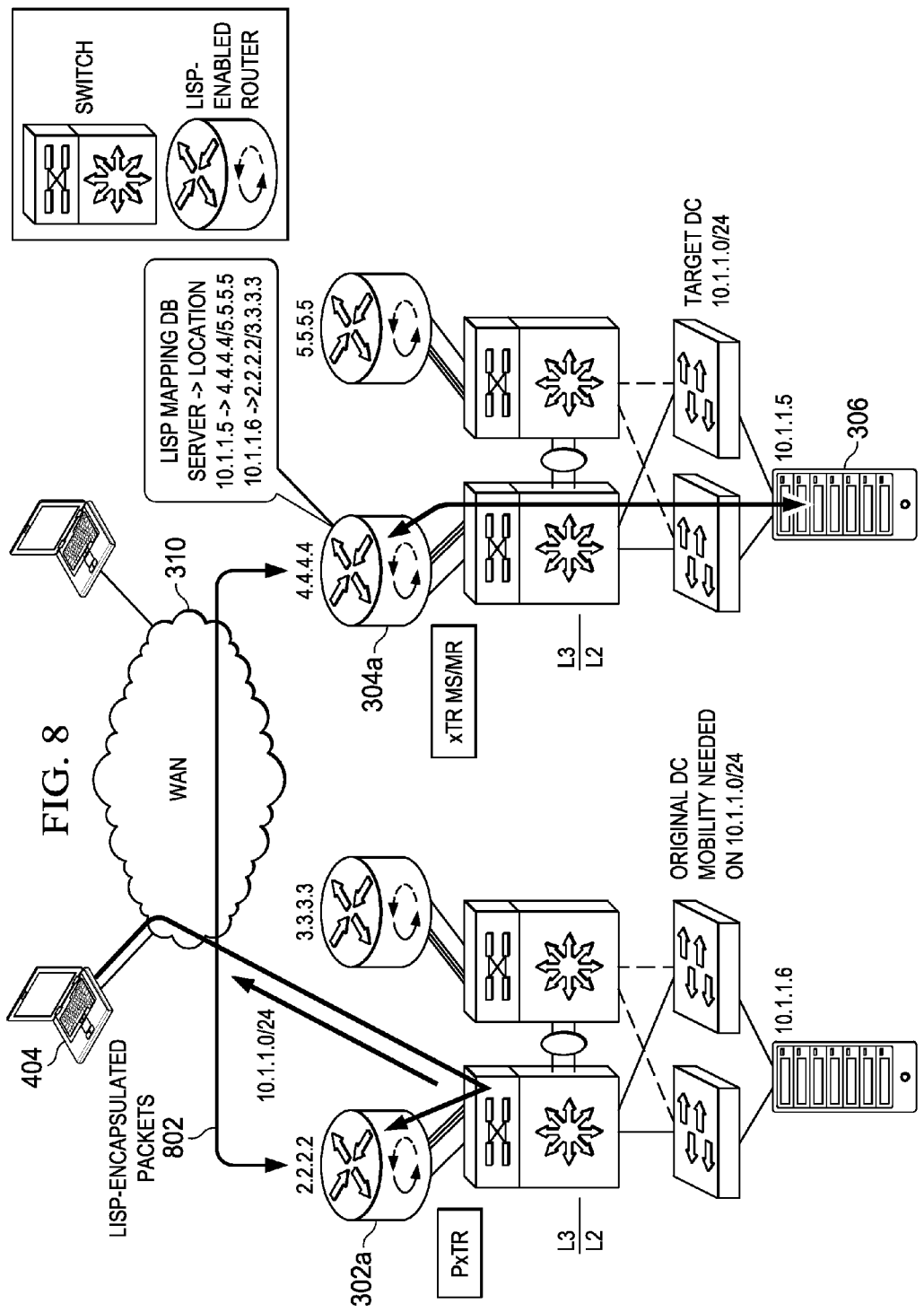
FIG. 8 is a simplified diagram showing a LISP tunnel for transporting LISP-encapsulated packets between a LISP router at the original data center and a LISP router at the target data center in order to route traffic from a network element on the wide area network to the migrated server, according to some embodiments of the disclosure.

FIG. 8 is a simplified diagram showing a LISP tunnel for transporting LISP-encapsulated packets between a LISP router at the original data center and a LISP router at the target data center in order to route traffic from a network element on the wide area network to the migrated server, according to some embodiments of the disclosure. Through the proxy ARP mechanism described in relation to FIG. 7, the first LISP router 302a may act as a LISP proxy ingress and egress tunnel router (PxTR) to transmit the traffic targeted to the first network element 306 via a LISP tunnel 802 between the first LISP router 302a and the second LISP router 304a. The second LISP router 304a may be configured as an ingress and egress tunnel router (xTR).

In some embodiments, the second LISP router 304a (or some other LISP entity/server/router) is configured with a mapping server (MS or "Map-Server") and a mapping resolver (MR or "Map-Resolver") (i.e., provided with their respective functions) to provide the mapping database system for both, the first and the second LISP routers (and any other LISP routers which queries or subscribes to the mapping database). The Map-Server and the Map-Resolver provides a "front end" for one or more EID-to-RLOC mapping databases. The Map-Server, which learns authoritative EID-to-RLOC mappings from an Egress Tunnel Router (ETR) or Proxy Tunnel Router (PxTR) and publishes them in a database. The Map-Resolver, which accepts Map-Requests from an Ingress Tunnel Router (ITR) or Proxy ITR and "resolves" the EID-to-RLOC mapping using a mapping database. Advantageously, Map-Server at the second LISP router 304a and MAP-resolver can be used by both, the first and second LISP routers such that the first LISP router 302a can learn from the mapping database (i.e., update their respective caches of the mapping database) that the first network element 306 is reachable via the LISP tunnel 802 established between the first LISP router 302a and the second LISP router 304a.

As seen in the FIGURE, a (horizontal) LISP tunnel 802 is established and provided between two endpoints, i.e., the first LISP router 302a and the second LISP router 304a. Upon attracting traffic targeted to the first network element 306, the first LISP router 302a, acting as a proxy, transmits the traffic targeted to the first network element to the second LISP router over a LISP tunnel 802 established between the first LISP router and the second LISP router. Likewise, the second LISP router 304a receives, from the first LISP router acting as a proxy via a LISP tunnel 802 established between the first LISP router and the second LISP router, the traffic targeted to the first network element. Prior to transmitting the traffic over the LISP tunnel 802, the first LISP router 302a encapsulates the traffic targeted to the first network element 306 as LISP-encapsulated packets. This encapsulation removes, at the first LISP router 302a, any virtual local area network information associated with the first location from the traffic targeted to the first network element prior to transmitting the traffic over the LISP tunnel.

Figure 9:
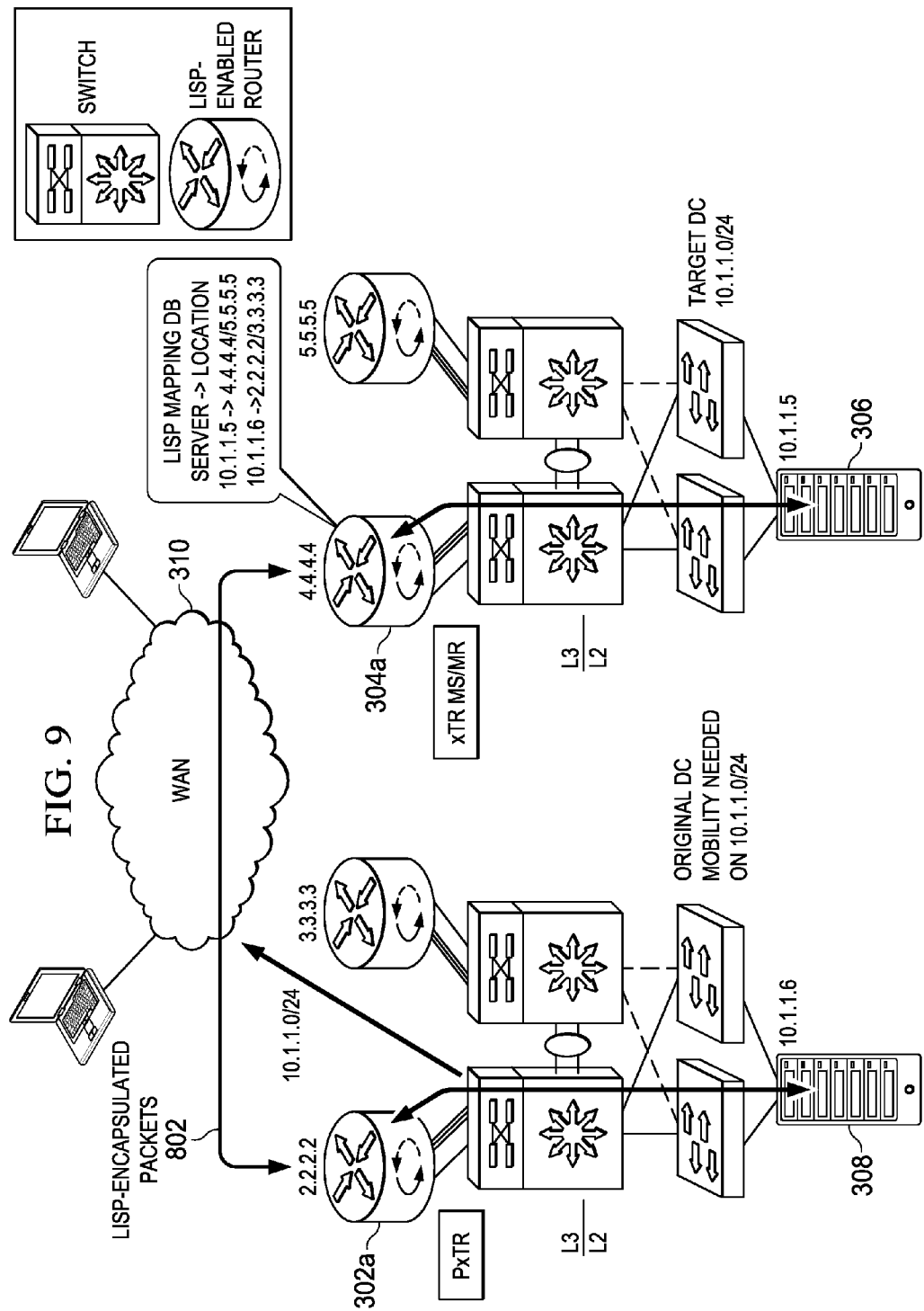
FIG. 9 is a simplified diagram showing a LISP tunnel for transporting LISP-encapsulated packets between a LISP router at the original data center and a LISP router at the target data center in order to route intra-subnet traffic from a network element on the subnet at the original data center to the migrated server, according to some embodiments of the disclosure.

FIG. 9 is a simplified diagram showing a LISP tunnel for transporting LISP-encapsulated packets between a LISP router at the original data center and a LISP router at the target data center in order to route intra-subnet traffic from a network element on the subnet at the original data center to the migrated server, according to some embodiments of the disclosure. Traffic targeted to the first network element 306 originating from a third network element 308 connected to the same subnet at the first location is also transmitted via the LISP tunnel 802 from the original DC to the target DC via the first LISP router 302a and the second LISP router 304a.

Policy Routing and Symmetry: Returning Traffic for Stateful Devices

Figure 10:
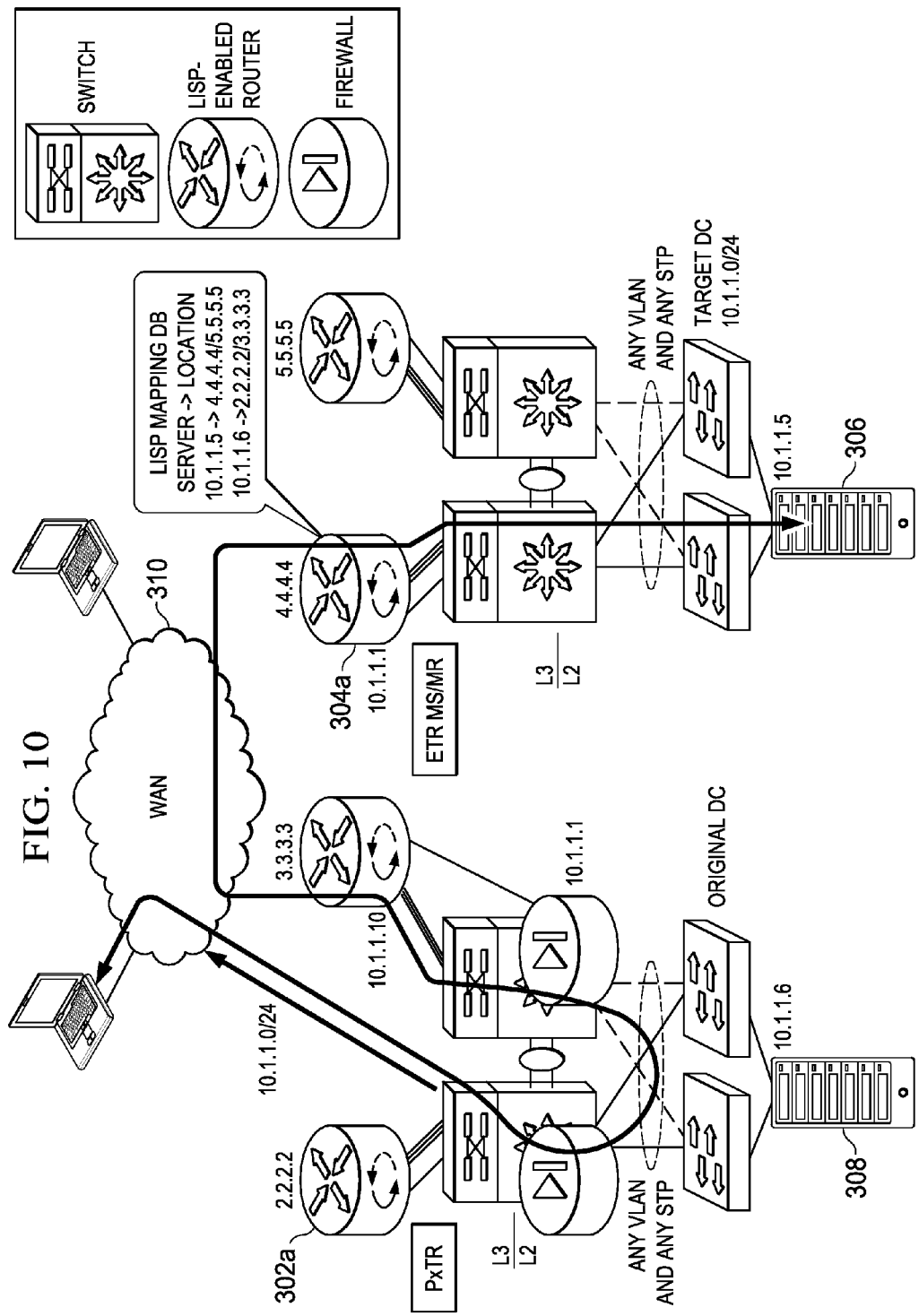
FIG. 10 is a simplified diagram showing a LISP router at the original data center for providing return traffic to a stateful device at the original data center, according to some embodiments of the disclosure.

FIG. 10 is a simplified diagram showing a LISP router at the original data center for providing return traffic to a stateful device at the original data center, according to some embodiments of the disclosure. In some embodiments, the original DC may include one or more stateful devices, e.g., a Firewall or Load Balancer. These stateful devices may be deployed as the default gateway on the original DC. Because the first LISP router 302a (and the redundant LISP router) is not configured as a default gateway (as LISP routers normally in the traditional implementation would), the stateful devices can remain as the default gateway. This allows LISP to be used even on the case where there is a Firewall or Load Balancer as the default gateway on the original DC. Furthermore, by adapting the LISP router(s) at the original DC to provide policy based routing, the return traffic from the target DC back to the original DC is diverted to the internal interface in order to ensure symmetry in the path that the traffic travels (i.e., bringing the return traffic back to the stateful device on the right interface). In other words, a policy is provided on the LISP routers at the original DC on traffic from the target DC to make sure to the "return traffic" is returned to the correct interface on the stateful device at the original DC (and not transported on the external interface of the LISP router). Specifically, the policy based routing at the LISP router at the first location is applied based on the inner (EID address space) source IP header so that traffic can be forced to be symmetric, returning to the stateful device (e.g., firewall or load balancer) on the same interface it originally traversed. Accordingly, when the first LISP router receives, from the second LISP router, return traffic from the first network element at the second location, the first LISP router transmits the return traffic from the first network element on an internal interface to provide the return traffic to a stateful device at the first location.

Different LISP Deployment Models

Figure 11A:
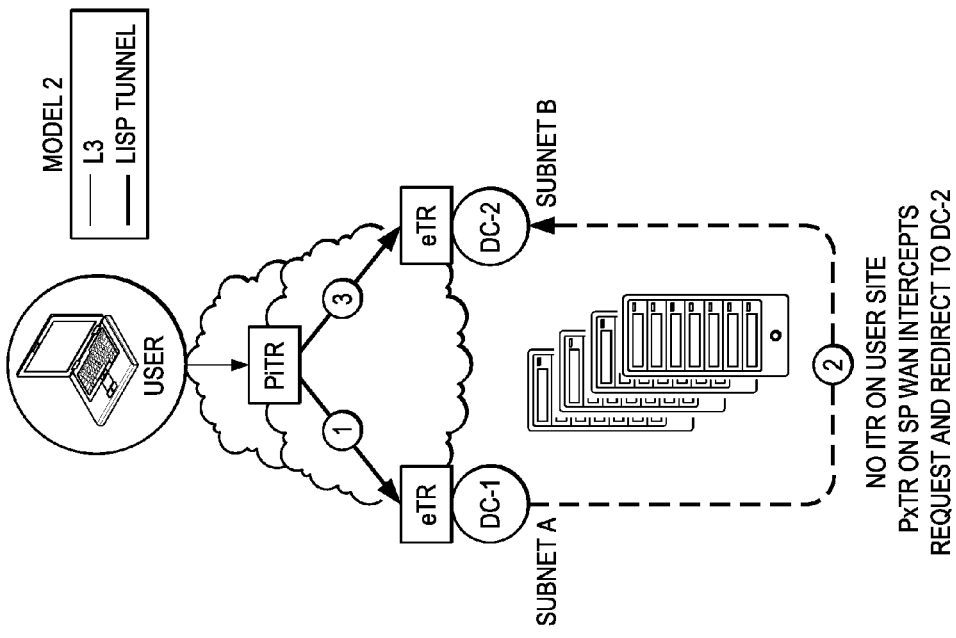
FIGS. 11A-B illustrates possible deployment models of LISP routers.
Figure 11B:
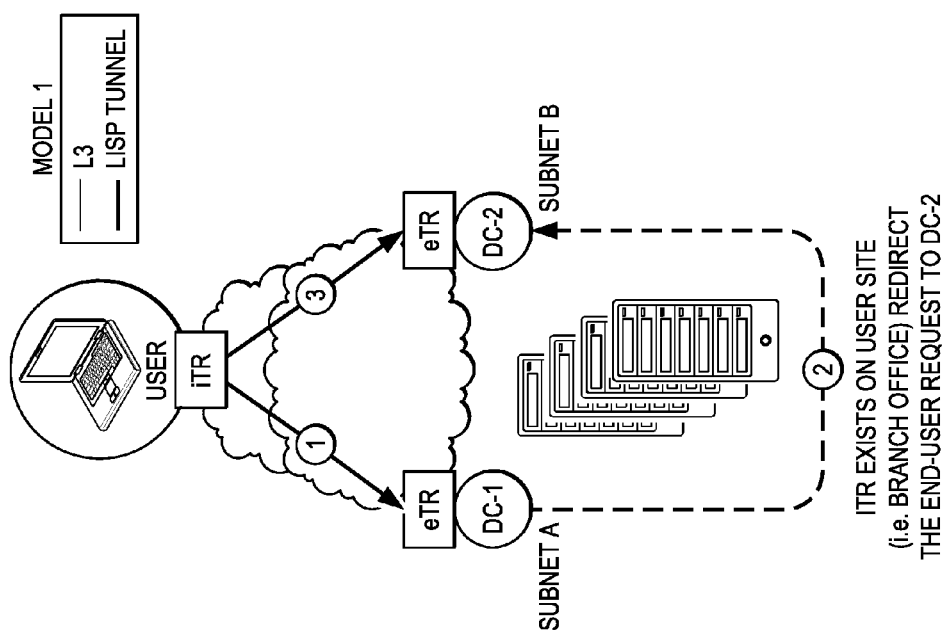

FIGS. 11A-B illustrates possible deployment models of LISP routers. Traditionally, the LISP tunnels are implemented vertically, as seen in FIGS. 11A-B. In FIG. 11A, LISP is deployed on the customer sites as well as on the customer Data Centers (i.e. LISP everywhere). In FIG. 11B, a PITR IS provided in the middle of the customer WAN and have non-LISP sites using it to reach the Data Centers (i.e. LISP partially deployed on customer WAN) The ingress tunnel routers (iTRs), and egress tunnel routers (eTRs) shown are implemented as default gateways and tunnels runs vertically between the user and the data centers.

FIG. 11C illustrates a deployment model corresponding to using LISP to enable migration of network elements without having to change the IP addresses of the network element, according to some embodiments of the disclosure. This new deployment model disclosed herein introduces a third option for LISP architecture, referred to as a "2-node LISP" model. On this new model LISP is only deployed on one node located deep inside the original DC, south of original DC aggregation layer, this router is performing the PxTR function at the edge of the network and not in the WAN, and the second node xTR is deployed on the new DC as the default gateway for the subnets where migration is needed. The Mapping-Server and Mapping-Resolver functions are also enabled on the router on the new DC, making this deployment model self-contained on those 2-nodes. As seen in FIG. 11C, the LISP tunnel runs horizontally across the data centers and stretches the subnet across both locations. For redundancy, this solution can be duplicated by duplicating the tunnel routers at the data centers.

Variations and Implementations

Within the context of the disclosure, a network used herein represents a series of points or nodes of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment, The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtual), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, LISP routers described herein may include software to achieve (or to foster) the functions discussed herein for enabling migration of network elements where the software is executed on one or more processors to carry out the functions. This could include the implementation of instances of LISP routing modules, map-server, map-resolver and/or any other suitable element that would foster the activities discussed herein. Additionally, each of these elements can have an internal structure (e.g., a processor, a memory element, etc.) to facilitate some of the operations described herein. In other embodiments, these functions for LISP routing may be executed externally to these elements, or included in some other network element to achieve the intended functionality. Alternatively, LISP routers may include software (or reciprocating software) that can coordinate with other network elements in order to achieve the LISP routing functions described herein. In still other embodiments, one or several devices may include any suitable algorithms, hardware, software, components, modules, interfaces, or objects that facilitate the operations thereof.

FIG. 12 shows an exemplary system diagram of an illustrative LISP router, according to some embodiments of the disclosure. The LISP router 1202 may include one or more processors 1204, one or more memory elements 1206. In some embodiments, the LISP router includes a LISP routing module 1208 implemented thereon to perform the LISP routing functions described herein. A mapping database 1210 may also be provided to maintain mappings of EIDs to RLOCs for LISP routing purposes.

In certain example implementations, the LISP routing functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors 1204, or other similar machine, etc.). In some of these instances, one or more memory elements 1206 can store data used for the operations described herein. This includes the memory element being able to store instructions (e.g., software, code, etc.) that are executed to carry out the activities described in this Specification. The memory element is further configured to store databases such as mapping databases to enable LISP routing functions disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the LISP routing, as outlined herein. Additionally, each of these devices may include a processor that can execute software or an algorithm to perform the activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of using LISP routing for migration, as potentially applied to a myriad of other architectures.

It is also important to note that the steps in the FIG. 2 illustrate only some of the possible scenarios that may be executed by, or within, the LISP routers described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the LISP routers in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for enabling a migration of network elements from a first location to a second location remote from the first location without changing the Internet Protocol (IP) addresses, subnet mask, and/or default gateway of the network elements, the first location having a first Locator/Identifier Separation Protocol (LISP) router configured on a stick and the second location having a second LISP router configured on a stick, both the first LISP router and the second LISP router on the same subnet, the method comprising:
   detecting, by the first LISP router, a first network element having a first Internet Protocol (IP) address at the first location prior to the migration;
   receiving, at the first LISP router via a mapping database from second LISP router at the second location after the migration, an entry mapping the first IP address to the IP address of the second LISP router; and
   updating, by the first LISP router, a cache of the mapping database of the first LISP router to configure the first LISP router to route traffic targeted to the first network element through the first LISP router.

2. The method of claim 1, further comprising:
   transmitting, from the first LISP router to a first switch at the first location to which the first LISP is connected on a stick, an address resolution protocol message to inform the first switch to route the traffic targeted to the first network element via the first LISP router.

3. The method of claim 1, further comprising:
   transmitting, from the first LISP router acting as a proxy to the second LISP router, the traffic targeted to the first network element over a LISP tunnel established between the first LISP router and the second LISP router.

4. The method of claim 3, wherein:
   encapsulating, by the first LISP router, the traffic targeted to the first network element as LISP-encapsulated packets prior to transmitting the traffic over the LISP tunnel.

5. The method of claim 3, wherein:
   removing, at the first LISP router, virtual local area network information associated with the first location from the traffic targeted to the first network element prior to transmitting the traffic over the LISP tunnel.

6. The method of claim 1, further comprising:
   receiving, at the first LISP router from the second LISP router, return traffic from the first network element at the second location; and
   transmitting, from the first LISP router, the return traffic from the first network element on an internal interface to provide the return traffic to a stateful device at the first location.

7. A method for enabling a migration of network elements from a first location to a second location remote from the first location without changing the Internet Protocol (IP) addresses, subnet mask, and/or default gateway of the network elements, the first location having a first Locator/Identifier Separation Protocol (LISP) router configured on a stick and the second location having a second LISP router configured on a stick, both the first LISP router and the second LISP router on the same subnet, the method comprising:
   detecting, at the second LISP router, a first network element having a first IP address at the second location, wherein the first network element was connected to the subnet at the first location prior to the migration using the same first IP address;
   updating, at the second LISP router, a mapping database to include an entry mapping the first IP address to the IP address of the second LISP router; and
   transmitting, from the second LISP router via the mapping database to the first LISP router, the entry to update a cache of the mapping database at the first LISP router to configure the first LISP router to route, to the second LISP router, traffic targeted to the first network element through the first LISP router.

8. The method of claim 7, further comprising:
   receiving, at the second LISP router from the first LISP router acting as a proxy via a LISP tunnel established between the first LISP router and the second LISP router, the traffic targeted to the first network element.

9. The method of claim 8, wherein:
   the traffic targeted to the first network element originates from a second network element connected to a wide area network.

10. The method of claim 8, wherein:
    the traffic targeted to the first network element originates from a third network element connected to the same or different subnet at the first location.

11. The method of claim 1, further comprising:
    configuring the second LISP router with the same IP address as a default gateway address used by the first network element prior to the migration.

12. A first Locator/Identifier Separation Protocol (LISP) router for enabling a migration of network elements from a first location to a second location remote from the first location without changing the Internet Protocol (IP) addresses of the network elements, said first LISP router connected to a first switch on a stick at the first location, the first LISP router comprising:

at least one memory element;

at least one processor coupled to the at least one memory element; and a LISP routing module that when executed by the at least one processor is configured to:

detect, at the first LISP router, a first network element having a first Internet Protocol (IP) address at the first location prior to the migration;

receive, from a second LISP router at the second location after the migration via a mapping database, an entry mapping the first IP address to the IP address of the second LISP router, wherein the second LISP router is configured on a stick to a second switch at the second location and both the first LISP router and the second LISP router on the same subnet; and update a cache of a mapping database at the first LISP router to configure the first LISP router to route, to the second LISP router, traffic targeted to the first network element through the first LISP router.

13. The LISP router of claim 12, wherein:

prior to the migration, the first LISP router connected to a first switch on a stick is not in a data path between the first network element and a second network element on the wide area network or between the first network element and a third network element located in the first location.

14. The first LISP router of claim 12, wherein the first LISP router is configured as a LISP proxy ingress and egress tunnel router to transmit the traffic targeted to the first network element via a LISP tunnel established between the first LISP router and the second LISP router.

15. A second Locator/Identifier Separation Protocol (LISP) router for enabling a migration of network elements from a first location to a second location remote from the first location without changing the Internet Protocol (IP) addresses of the network elements, said second LISP router connected to a second switch on a stick at the second location, the second LISP router comprising:

at least one memory element;

at least one processor coupled to the at least one memory element; and a LISP routing module that when executed by the at least one processor is configured to:

detect, at the second LISP router, a first network element having a first IP address at the second location, wherein the first network element was connected to a subnet at the first location prior to the migration using the same first IP address;

update a mapping database to include an entry mapping the first IP address to the IP address of the second LISP router; and transmit to the first LISP router via the mapping database, the entry to update a cache of the mapping database at the first LISP router to configure the first LISP router to route, to the second LISP router, traffic targeted to the first network element through the first LISP router, wherein the first LISP router is configured on a stick to a first switch at the first location and both the first LISP router and the second LISP router on the same subnet.

16. The second LISP router of claim 15, wherein the second LISP router is configured as an LISP ingress and egress tunnel router with a mapping server and a mapping resolver implemented thereon to maintain the mapping database and transmit updates to a cache of the mapping database at the first LISP router.

17. A system for enabling a migration of network elements from a first location to a second location remote from the first location without changing the Internet Protocol (IP) addresses of the network elements, the system comprising:

a first LISP router configured on a stick to a first switch at the first location;

a second LISP router configured on a stick to a second switch at the second location, wherein both the first LISP router and the second LISP router on the same subnet; and a horizontal LISP tunnel between the first LISP router and the second LISP router providing a Layer 3 extension stretching a subnet across the first location and the second location;

wherein the second LISP router is configured to, via a mapping database, update a cache of the mapping database at the first LISP router to configure the first LISP router to route, via the first LISP router over the horizontal LISP tunnel, traffic targeted to a first network element migrated from the first location to the second location.

18. The system of claim 17, wherein:

the cache of the mapping database at the first LISP router and a cache of the mapping database of the second LISP router each comprises an entry mapping a first IP address of the first network element to the IP address of the second LISP router, wherein the first network element was connected to a subnet at the first location prior to the migration using the same first IP address.

19. A computer-readable non-transitory medium comprising one or more instructions, for enabling a migration of network elements from a first location to a second location remote from the first location without changing the Internet Protocol (IP) addresses, subnet mask, and default gateway of the network elements, the first location having a first Locator/Identifier Separation Protocol (LISP) router configured on a stick and the second location having a second LISP router configured on a stick, both the first LISP router and the second LISP router on the same subnet, that when executed on a processor configure the processor to perform one or more operations comprising:

detecting, by the first LISP router, a first network element having a first Internet Protocol (IP) address at the first location prior to the migration;

receiving, at the first LISP router via a mapping database from a second LISP router at the second location after the migration, an entry mapping the first IP address to the IP address of the second LISP router; and updating, by the first LISP router, a cache of the mapping database at the first LISP router to configure the first LISP router to route, to the second LISP router, traffic targeted to the first network element through the first LISP router.

20. A computer-readable non-transitory medium comprising one or more instructions, for enabling a migration of network elements from a first location to a second location remote from the first location without changing the Internet Protocol (IP) addresses, subnet mask, and default gateway of the network elements, the first location having a first Locator/Identifier Separation Protocol (LISP) router configured on a stick and the second location having a second LISP router configured on a stick, both the first LISP router and the second LISP router on the same subnet, that when executed on a processor configure the processor to perform one or more operations comprising:

detecting, at the second LISP router, a first IP address of a first network element located at the second location, wherein the first network element was connected to a subnet at the first location prior to the migration using the same first IP address;

updating, at the second LISP router, a the mapping database to include an entry mapping the first IP address to the IP address of the second LISP router; and transmitting, from the second LISP router via the mapping database to the first LISP router, the entry to update a cache of the mapping database at the first LISP to configure the first LISP router to route, to the second LISP router, traffic targeted to the first network element through the first LISP router.

* * * * *